United States Patent [19]
Espeut et al.

[11] Patent Number: 5,657,376
[45] Date of Patent: Aug. 12, 1997

[54] ARCHITECTURE FOR VOICE MESSAGING SYSTEMS

[75] Inventors: Donald B. Espeut; Sonny R. Bettis, both of Lawrenceville, Ga.

[73] Assignee: Glenayre Electronics, Inc., Charlotte, N.C.

[21] Appl. No.: 543,036

[22] Filed: Oct. 13, 1995

[51] Int. Cl.⁶ .............................. H04M 1/64; H04M 3/46
[52] U.S. Cl. .............................. 379/89; 379/211; 379/210; 455/459
[58] Field of Search .............................. 379/67, 88, 89, 379/57–66, 210, 211, 201

[56] References Cited

U.S. PATENT DOCUMENTS

5,193,110  3/1993  Jones et al. .............................. 379/89
5,475,748  12/1995  Jones .............................. 379/211

Primary Examiner—Fan Tsang
Attorney, Agent, or Firm—Christensen O'Connor Johnson & Kindness

[57] ABSTRACT

An improved architecture for providing high capacity capability to voice message systems is disclosed. The system includes a plurality of stand-alone voice message processors (VMP), each of which are communicatively connected via a high-speed local area network. Each of the voice message processors are communicatively connected to a network interface module (NIM) that receives all incoming calls from a public switched telephone network (PSTN). A control module is connected to the NIM and also interfaces with each of the VMPs over the local area network. As each incoming call is received, the control module routes the call to the appropriate VMP assigned to the subscriber to whom the call is designated. A terminal server is also connected to the local area network. The terminal server receives calls from subscribers utilizing a personal computer. In this manner, a subscriber can access his or her voice mailbox account.

7 Claims, 10 Drawing Sheets

ARCHITECTURE FOR VOICE MESSAGING SYSTEMS

FIELD OF THE INVENTION

This invention relates generally to automatic voice messaging systems and, more particularly, to a high capacity voice messaging system having meet-me capability.

BACKGROUND OF THE INVENTION

Voice messaging systems (VMS) have proliferated in both residential and business use. In the residential context, a VMS can be as simple as an answering machine. In the business context, a VMS can be as complex as a multi-million dollar system for use in telephone switching centers. It is in the business context with which the present invention is concerned. With the proliferation of VMSs, voice messaging service providers have required higher and higher processing capacity out of their VMSs. For example, the ability to handle large number of calls simultaneously is important where the subscriber base to a single VMS is large. In addition, the capability of storing large amounts of voice messages efficiently is an important consideration. Although some VMS manufacturers have taken the approach of simply increasing the number of input/output telephone ports in their VMSs or simply increasing the number of storage devices in each VMS, the physical constraints of such an arrangement often are impractical.

In addition, VMSs have expanded beyond their traditional role of merely being a reservoir of voice messages. Indeed, many modern VMSs include the ability to connect a calling party to the subscriber. Thus, the voice storage function of a VMS is an ancillary function to the more primary function of connecting a calling party (referred to also as the caller) to a subscriber (referred to also as the called party). This feature is also referred to as a "meet-me" feature. For example, one such system that connects a calling party to a called party is described in U.S. Pat. No. 5,307,399 to Dai et al. and assigned to the same assignee of the herein invention. In addition, a commonly assigned co-pending application Ser. No. 08/302,682, herein incorporated by reference, describes in detail a method of connecting a calling party to a called party. However, as described in the '399 patent and '682 pending application, when a calling party and a subscriber are ultimately connected and in conversation, one incoming port (referred to also as a trunk line) of the VMS and one outgoing port of the VMS are occupied. The number of conversations is thus limited to the number of incoming and outgoing ports of the VMS. Typically, the number of ports in a VMS is on the order of 100 ports. Therefore, the maximum number of meet-me connections would be fifty and, in that case, any additional calls to the VMS would encounter a busy signal.

To expand the capacity of VMSs to provide these services to a large number of subscribers in an efficient manner, it is necessary to provide a new system architecture in order to provide adequate service.

SUMMARY OF THE INVENTION

The present invention relates generally to an improved system architecture for providing high capacity capability to voice message systems. The system of this invention includes a plurality of stand-alone voice message processors (VMP). Each of these voice message processors are communicatively connected via a high-speed local area network. In addition, each of the voice message processors are communicatively connected to a network interface module (NIM) that receives all incoming calls from a public switched telephone network (PSTN). The NIM is the sole point of contact between the voice message system and the PSTN. A control module is connected to the NIM and also interfaces with each of the VMPs over the local area network. As each incoming call is received, the control module routes the call to the appropriate VMP assigned to the subscriber to whom the call is designated.

A terminal server is also connected to the local area network. The terminal server receives calls from subscribers utilizing a personal computer to connect with the voice message system. In this manner, a subscriber can access his or her voice mailbox account. Further, in the preferred embodiment, at least one VMP in the voice message system includes an applications resource module (ARM) and a transaction processor (TP). The ARM is a hardware and software module that can implement a specific function, such as receive and store facsimile messages, recognize speech, or perform some other functionality. A plurality of the VMPs in the voice message system can access the ARM and share the ARM.

In accordance with other aspects of the present invention, the voice message system of the present invention is designed to be used in conjunction with a cordless telephone-2 (CT-2) system to provide a low-cost portable bidirectional communications system. In a CT-2 system, the subscribers are provided with small, low-powered portable radio transceivers called handsets. The system also includes a set of base stations that are located throughout the geographic area in which the system is installed. The base stations are connected to the PSTN. A CT-2 system subscriber makes a telephone call by first establishing a radio link through his/her handset to a nearby base station. The subscriber then transmits the number of the party being called; equipment in the base station then establishes the subscriber/called party interconnection over the PSTN.

The system of this invention, when combined with a CT-2 system, functions to allow system subscribers with CT-2 handsets to both make outgoing calls and receive incoming calls. In the system of this invention, the CT-2 subscribers are provided with pagers which are built into the CT-2 handsets. The CT-2 handsets are also provided with an autodial circuit that allows the subscriber to dial a number connecting to the NIM of the voice message system with the press of a single button. When a call is made to one of the subscribers to this system, the call is placed on hold while a page is broadcast to the subscribers CT-2 handset. Upon receipt of the page, the subscriber can complete the call by actuating the autodial button on the handset. This causes the CT-2 system to access the system which then connects the caller to the subscriber so that they can converse.

Other features of the voice message system of this invention enhance its utility to subscribers and callers alike. In the event a subscriber does not complete a phone connection to a caller, the caller can be invited to leave a voice-mail message on the appropriate VMP that the subscriber can retrieve at his convenience.

BRIEF DESCRIPTION OF THE DRAWINGS

The invention is defined with particularity in the appended claims. The advantages of this invention may be understood by referring to the following detailed description in which:

DETAILED DESCRIPTION OF THE PREFERRED EMBODIMENT

Figure 1:
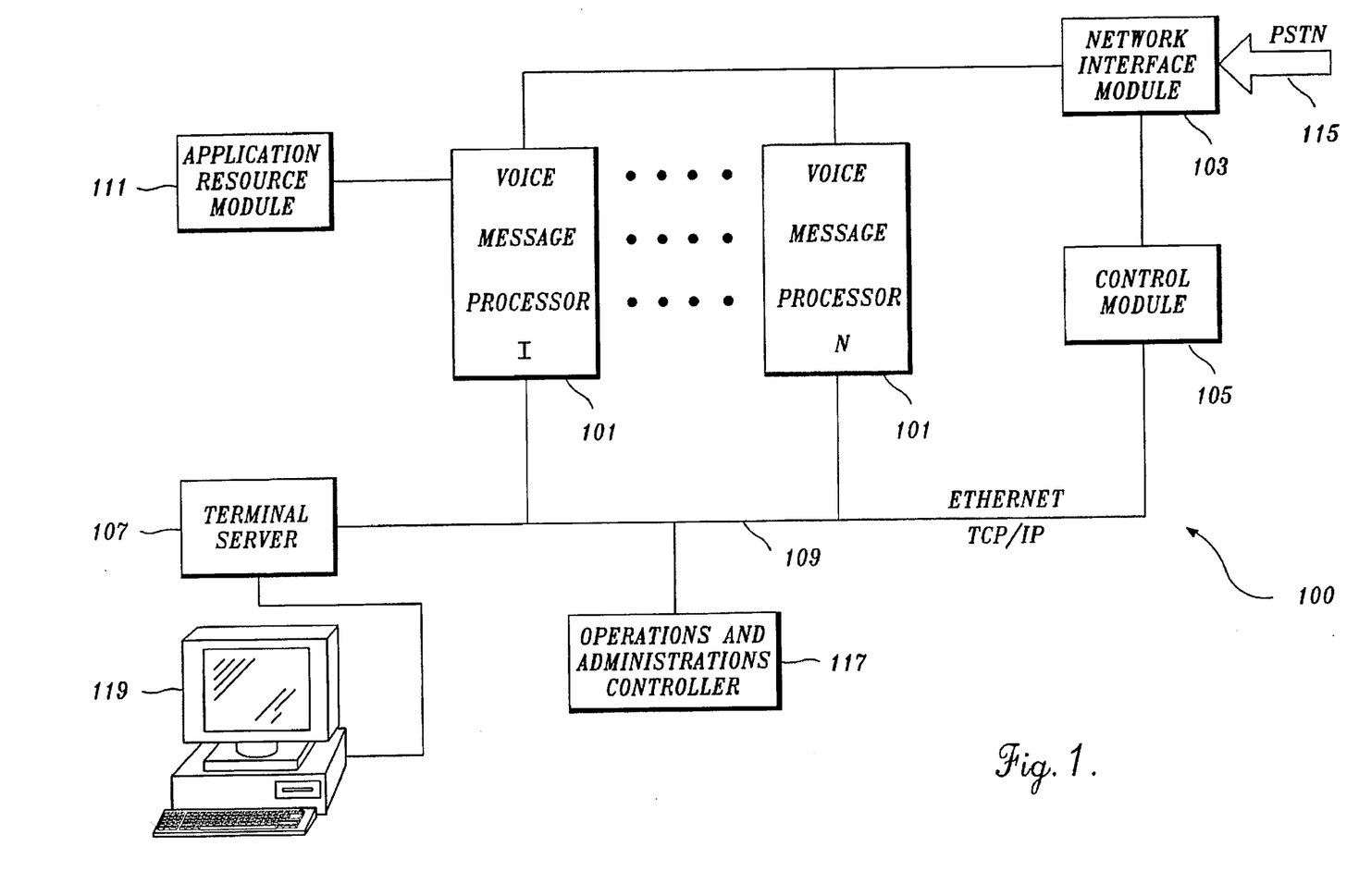
FIG. 1 is a block diagram illustrating the main components of the system of this invention.

Referring to FIG. 1, a block diagram of a voice message system 100 formed in accordance with the present invention is shown. The system 100 includes a plurality of voice message processors (VMP) 101, a network interface module (NIM) 103, a control module 105, a terminal server 107, an operations and administration controller (OAC) 117, and a local area network (LAN) 109. In addition, one VMP includes an application resource module (ARM) 111.

Figure 2:
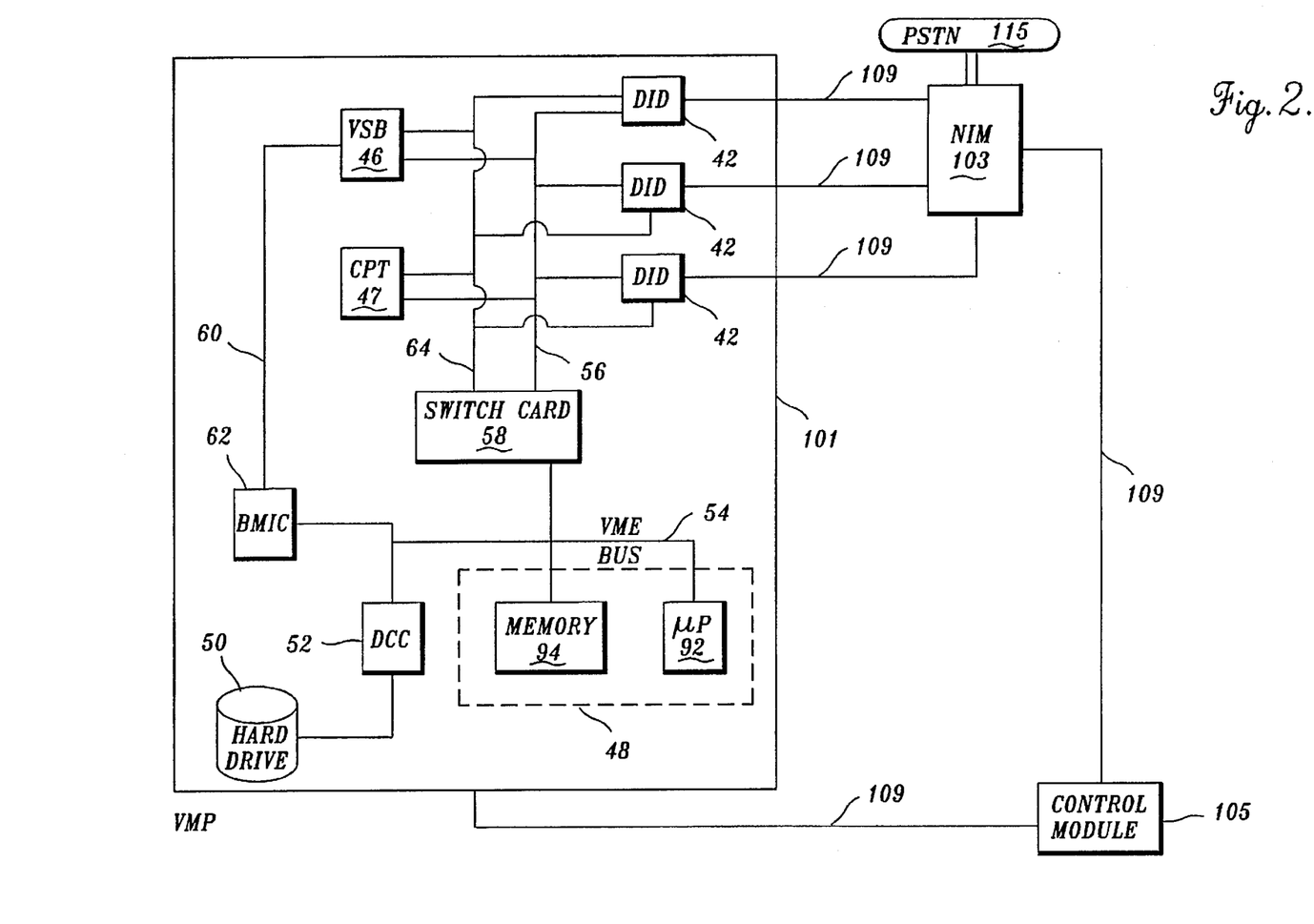
FIG. 2 is a schematic diagram of a VMP formed in accordance with the present invention.

In the preferred embodiment, the VMPs 101 are manufactured by Glenayre Electronics, Inc. under the trademark GL3000. Also preferred is the VMP 101 manufactured by Glenayre Electronics, Inc. under the trademark MVP®. To summarize the operation of the VMPs 101, as seen in FIG. 2, the VMPs 101 include a plurality of direct inward dial (DID) cards 42 that function as the interface between the VMP 101 and the NM 103. The VMP 101 also has at least one voice storage board (VSB) 46 that serves as a temporary buffer to store voice messages for replay out to the system subscribers through the DID cards. The VSB also contains a number of set, prerecorded voice messages, such as greetings, system instructions, and/or system state announcements that are selectively played to the callers or the system subscribers. A call progress tone (CPT) card 47 includes a set of components that generate various audio tones that are selectively played to system subscribers and other individuals that access the system.

The overall operation of the VMP 101 is controlled by a central processing unit (CPU) 48. A hard drive 50 serves as the memory that contains information, such as a subscriber record, for each subscriber, which lists the services that the subscriber uses. The hard drive 50 also functions as the memory in which the voice messages that are left for the subscriber are stored. The writing of information into and the reading of information out of the hard drive 50 are controlled by a disk controller card (DCC) 52.

The CPU 48 and the DCC 52 are connected by a common communications pathway, referred to as the VME bus 54. A second bus, a data and control (DAC) bus 56 serves as the pathway over which data and control signals are transferred to and from the CPU 48 and the DID cards 42, the VSB 46, and the CPT card 47. A switch card 58 serves as the interface between the VME bus 54 and the DAC bus 56. The switch card 58 converts the signals passing over each of the buses 54 and 56 into an appropriate format so that the signals can be distributed over the other bus. Digitized voice signals are transferred between the VSB 46 and the VME bus 54 over a direct-memory access (DMA) bus 60. A buffer memory interface card (BMIC) 62 provides a high-speed window between the VME bus 54 and the DMA bus 60 to allow the transfer of signals therebetween.

Digitized audio signals, including voice signals, are transferred between the DID cards 42, the VSB 46 and the CPT card 47 over a pulse code modulation (PCM) highway 64. The switch card 58 regulates the flow of data over the PCM highway 64 pursuant to instructions generated by the CPU 48.

In one preferred embodiment of the invention, each DID card 42 is capable of being connected to the LAN 109 that extends from NIM 103. When a call is forwarded from the NIM 103 to a DID card 42, the "header" portion of the call contains signals that identify the phone number being called. This header material is in the form of a digital message. The DID card 42 transmits the header information, as part of a message announcing the call, to the CPU 48. If the CPU 48 determines that the call is to a "valid" subscriber number, the DID card 42 is instructed to establish a connection to the NIM 103. In response to such a command, the DID card 42 instructs the control module 105 via LAN 109 call to establish a connection to the caller. The DID card 42 is further provided with processing circuitry that converts the audio signals received from the caller, which are in an analog format, to a digital format. The digitized audio signals are then transmitted by the DID card 42 to other subsystems of the VMP 101 over the PCM highway 64. The DID card 42 is further capable of converting digitized audio signals received over the PCM highway into an analog format. The analog audio signals are distributed by the DID card 42 through the LAN 109, the NIM 103 and the PSTN 115 to the telephone over which the call to the system was made in order to produce recognizable speech.

The VSB 46 facilitates the transfer of the digitized voice signals between the DMA bus 60 and the PCM highway 64. Included on the VSB 46 are components for converting signals between the format over which they are broadcast on the DMA bus 60 and the format over which signals are broadcast on the PCM highway 64. The VSB 46 also includes a set of buffers in which the voice signals are temporarily stored before they are distributed over the DMA bus 60 or the PCM highway 64. Typically, messages for a subscriber's mailbox are first stored in the VSB buffers prior to the forwarding of the messages to the hard drive 50 over the DMA bus 60. When messages are retrieved for play, or retrieved for transmission as a voice page, they are also first stored on the VSB buffers prior to their broadcast over the PCM highway 64. Some messages, such as notices a subscriber wants broadcast or customized greetings that are generated by a subscriber, can consist of multiple-message segments. When such messages are to be played, the individual message segments are first concatenated in the VSB buffers. Once the complete message has been assembled, it is broadcast over the PCM highway 64 to the appropriate destination.

The VSB 46 further includes a section of memory in which standard system messages are always stored. These messages include system greetings, instructions and/or mailbox status information that is frequently played out to system subscribers and other individuals who access the paging system. These messages are contained in the system hard drive 50. When the VMP 101 is initialized, these messages are uploaded into the VSB 46 for quick access. The distribution, or play, of these messages is controlled by commands generated by the CPU 48.

The CPT card 47 contains a set of circuits for generating a number of audio tones that can be selectively played when an individual calls the system. One form of CPT 47, for example, is capable of generating five distinct tones. A ring tone can be generated in order to give the caller the impression that the VMP 101 is in the process of completing some portion of the call. A busy tone is generated to inform the caller that, for some reason, the call cannot be completed. An answer tone can be generated to serve as an instructionless announcement that the caller can enter commands into the system. In other words, the answer tone is generated to inform system subscribers and other knowledgeable individuals that a set of commands or data must be entered in order for the operation of the system to proceed. Usually commands are entered into the VMP 101 by "overdialing," which is the act of generating one or more DTMF after the call has been connected. The processing equipment on the DID cards 42 decodes the commands and broadcasts them to the CPU 48 over the DAC bus 56. Another tone the CPT card 47 generates is an accept tone. The accept tone is played to a caller upon the entry of a voice message or overdial instructions to acknowledge entry of the message or the instructions.

In one preferred embodiment of the invention, the switch card 58 performs three functions. Specifically, the switch card 58 includes a clock circuit that generates the master clocking signal to which all the other subunits of the VMP 101 are synchronized. The switch card 58 also includes conversion circuitry that facilitates the exchange of signals between the VME bus 54 and the DAC bus 56. The function executed by the switch card 58 is the control of digitized voice-signal transfer over the PCM highway 64.

The CPU 48 includes a microprocessor ($\mu$P) 92 that controls the overall operations of the VMP 101. The CPU further includes a memory 94 that contains instructions that are executed by the microprocessor 92 and data that are used by and/or generated by the microprocessor. In one preferred embodiment of the invention, a Motorola® 68030 32-bit processor is employed as the microprocessor 92. The memory 94 includes 32 Mbytes of memory integrally associated with the microprocessor 92 and another 64 Mbytes of memory located on a separate memory card.

The tasks, or programs, that are selectively executed by the CPU 48 to control the VMP 101. It should be understood that the microprocessor 92 is provided with an operating system that allows multitasking, wherein the execution of multiple tasks can be interleaved with each other. Generally, the CPU 48 performs application tasks and support tasks. The application tasks are the tasks that control the actual call interconnections, message storage and replay, and page generations that are performed by the VMP 101. The support tasks are the underlying tasks that make execution of the application tasks possible. The support tasks include the control of any printers, operator terminals, or other input/ output devices that are connected to the VMP 101 for the generation of data on these devices. Other support tasks include interface tasks that control interfaces to be established between the VMP 101 and other devices, such as paging terminals. The structure of the above support tasks is generally known by those familiar with data-processing equipment and will not be further described. As noted above, the description of the VMP 101 thus illustrates that the VMP 101 can be used as a stand-alone voice message system. Indeed, in the preferred embodiment, where the VMP 101 is a Glenayre Electronics MVP®, the VMP 101 is often used as a stand-alone system. However, because of the limited number of DIDs 42 and the capacity of hard drive 50, a single VMP 101 has significant performance restraints.

The application resource module 111 is a hardware module that supports applications such as speech recognition, text-to-speech, fax modems, and data modems. The functionality of the application resource module is provided by third party vendors such as Dialogic Corp. and Natural Micro Systems Corp. for voice recognition functionality and Brooktrout Technology, Inc. for fax delivery systems. Thus, the specific details of constuction and operation of hardware to implement a specific functionality is known in the prior art. The application resource module 111 is a peripheral device that the VMP's 101 can utilize.

Moving next to the local area network 109 component of the voice message system 100, the local area network 109 is preferably a high-speed Ethernet® network or a TCP/IP network. Such a local area network allows for high throughput of data between the respective components of the system, on the order of 100,000 bytes of data per second. In addition, by using a standard network protocol such as Ethernet® or TCP/IP, voice message system 100 has the capability to interface with VMPs 101 manufactured by other manufacturers. Although it is preferred that all communications between all components of the voice message system 100 use the local area network 109, it may be possible to substitute other communications connections for the connection between the NIM 103 and the control module 105. For example, a RS232 serial port connection running at 19,200 baud may be used.

The network interface module 103 is operative to receive incoming calls from the PSTN 115. The NIM 103 is also capable of handling outgoing calls placed by the VMPs 101. In one preferred embodiment, the NIM 103 is the LNX-2000 switch manufactured by Excel Corp. A LNX-2000 serving as NIM 103 would have 1536 ports to handle incoming and outgoing calls. As can be appreciated, the use of NIM 103 greatly enhances the number of incoming and outgoing ports to the PSTN 115 when compared to a single VMP 101 typically having approximately 100 ports.

A predetermined portion of the ports of the NIM 103 are designated as receiving incoming calls from the PSTN 115. Another predetermined number of ports of the NIM 103 are designated as interfacing with the various VMPs 101. The NIM 103 is responsible for providing the interface between the voice message system 100 to the PSTN 115 for all call terminations and originations. In addition, the NIM 103, when a call is incoming, is responsible for determining the number of the calling party by examining the automatic number identification (ANI) information transmitted by the PSTN 115. As will be seen in greater detail below, the NIM 103 is also responsible for connecting the calling party to the subscriber in a "meet-me" feature. In such an application, the NIM 103 will also be responsible for placing a calling party on hold when the system attempts to contact the subscriber that is being called.

Control of the entire voice message system 100 is handled by the control module 105. The control module controls each and every port of the NIM 103. Preferably, this control is via the local area network 109. Alternatively, for some applications, a RS232 connection may be used to route control commands. In the preferred embodiment, the control module 105 is a MVME187 microprocessor with 16 Mbytes of random access memory manufactured by Motorola, Inc. Further, in the preferred embodiment, the control module 105 runs the System 5 UNIX operating system manufactured by Motorola, Inc. of Schaumburg, Ill. The control module 105 runs a state driven program for controlling each port of the NIM 103. Thus, the control module maintains a record of the status (or state) of each port of the NIM 103. In the preferred embodiment, each port of the NIM 103 can occupy the following states:

Idle State: port awaiting an incoming call or available for outbound call;

New Call Processing State: port is processing a new call and is awaiting response from the VMP as to next action;

Invalid Number State: port has received as an incoming call an invalid number and should ring a busy signal to caller;

Disconnect State: port has received a disconnect message and is preparing to terminate connection;

Answer State: port acknowledges valid incoming call and routes call through to appropriate direct inward dial port of appropriate VMP;

Hold State: port holds incoming call while not being connected to the VMP; and

Outcall State: port is placing a call from the voice message system to the PSTN.

In addition, the control module includes a routing table for use in determining which particular VMP 101 is assigned to each subscriber. Therefore, as the incoming calls are received, the control module 105 analyzes the seven digit called number. It can be appreciated that other length numbers can be provided also, for example, calls from foreign telephone networks. From the called number, the particular subscriber the call is intended for can be ascertained. At that point, the control module 105 can determine to which VMP 101 the call should be routed.

The OAC 117 controls the monitoring of maintenance activities as well other administration functions of the VMPs 101. Any necessary maintenance or reconfiguration of the VMPs 101 is accomplished via the OAC 117. The OAC 117 is primarily implemented as a software package resident on a personal computer or terminal. The OAC 117 connects to the local area network 109 and can access each VMP 101 using known protocols, i.e., access to each VMP 101 of the system 100 is the same as if the VMP 101 were a stand along voice messaging system. It is preferred that the OAC 117 provide to the user a graphical user interface in order to allow system operators and adminstrators easy access to system information. Typically, the information accessed by the OAC 117 will include identity of subscribers, alarm indications of the VMPs 101, billing records, traffic logs, and other statistics. Other duties to be handled by the VMPs 101 include input of new subscribers, account reports and summaries, start/stop shutdown procedures, backup of hard disk data, and configuration of the system 100.

Finally, the terminal server 107 is used to allow subscribers to access their accounts on the VMPs 101 via personal computer 119. The terminal server 107 also includes an associated modem bank (not shown) that answers the incoming calls and routes the calls to the terminal server 107 via a RS232 interface. In particular, when a subscriber wishes to change a parameter within his or her account, the subscriber uses personal computer 119 to access the terminal server 107 via a standard telephone dial-up line (not associated with the telephone lines input into NIM 103). Each VMP 101 desiring to provide remote access provides the terminal server 107 with a database that identifies those subscribers having direct access. The terminal server 107 is operative to route the subscriber over the LAN 109 to the appropriate VMP 101. In one preferred embodiment, the terminal server 107 is a model VCP/300 manufactured by Penril Datability, Inc.

DETAILED OPERATION OF THE VOICE MESSAGE SYSTEM

Figure 3A:
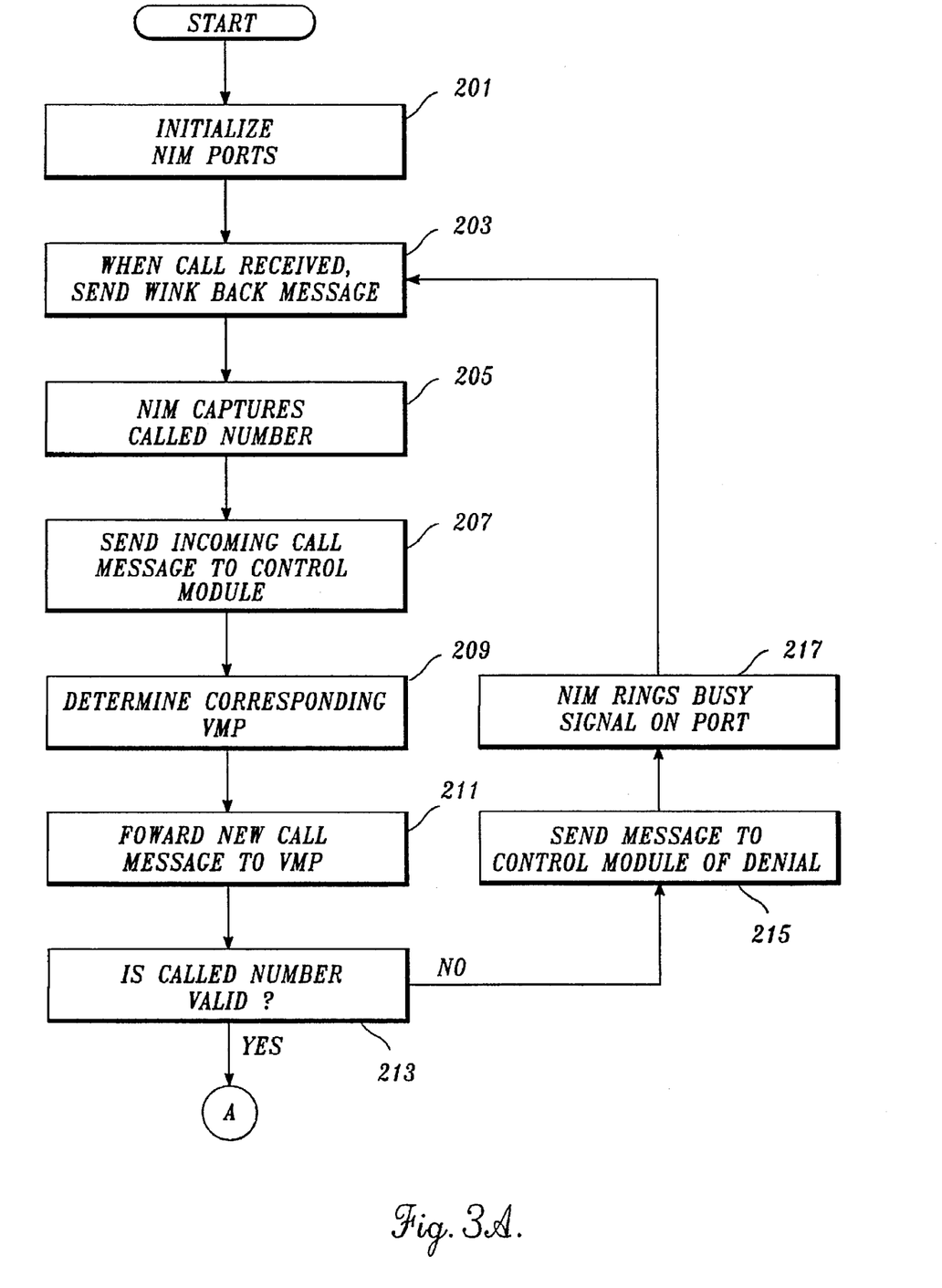
FIGS. 3A and 3B are detailed block diagrams illustrating how an incoming call is handled by the voice message system of the present invention.

Turning next to FIG. 3A, a flow diagram is seen that illustrates the process of the voice message system 100 processing an incoming call to a subscriber. First, at a box 201, the system is initialized. When the system 100 is first powered up, an initialization message is sent from the control module 105 to the NIM 103. The initialization message causes the NIM 103 to set all of the ports of the NIM 103 into an idle state. In addition, the control module 105 initializes its own memory to reflect that all ports of the NIM 103 are in idle state. It should be noted that the initialization message, and indeed all messages between the various components of voice message system 100, are carried via the local area network 109. Alternatively, as noted above, a RS232 interface connection may be substitued for the local area network 109.

In addition, the initialization message directs the NIM 103 as to how to handle incoming calls. In one embodiment, the initialization message directs to NIM 103 to send a "wink back" message to the PSTN 115 when an incoming call occupies a NIM 103 port. Thus, at box 203, when an incoming call is received, the PSTN 115 sends a wink back message to the control module 105. Next, at box 205, the NIM 103 will actuate a DTMF decoder incorporated therein and capture the seven-digit telephone number that is being called by the incoming call.

At a box 207, NIM 103 will transfer to the control module 105, via the LAN 109, an incoming call message indicating that an incoming call has arrived. The incoming call message will also contain the seven-digit telephone number (the called number) that was dialed and the specific port on the NIM 103 that the call has arrived on.

Next, at box 209, when the control module 105 receives the new call message, the control module 105 will examine its routing table to determine the particular VMP 101 that corresponds to the called number received. After the proper VMP 101 is found, at box 211, the control module 105 will then send a "NEWCALL" message to the corresponding VMP 101 along with the called number received. The control module 105 will also change the state of the port that the incoming call is incident on the NIM 103 to a new call processing state and await a response from the VMP 101.

When the VMP 101 receives the NEWCALL message, at box 213, the VMP 101 will perform a database lookup of the called number to determine if the number is valid and is in service. Each VMP 101 is equipped with a database that contains various types of information of each subscriber serviced by that particular VMP 101. For example, each database record for each particular subscriber will contain a "class of service" field that delineates which features of the voice message system 100 the subscriber is entitled. In addition, among other information, the database record will contain information as to whether the subscriber's account is current, the unique seven-digit number assigned to the subscriber, and an indication as to whether or not the account of the subscriber is in service. Thus, at box 213, the CPU 48 of VMP 101 will access the hard drive 50 for the database record corresponding to the called number. Once the corresponding database record has been retrieved, CPU 48 reviews the status of the subscriber.

If the lookup of the called number indicates that service to that subscriber has been suspended (for example, for non-payment of fees) or otherwise invalid, at box 215, the VMP 101 will send a message to the control module 105 to change the state of the port of the NIM 103 that the incoming call is incident to an invalid number state and deny the incoming call. In particular, the control module 105 will send a message to NIM 103 that will cause a busy signal to ring on the port and received, via the PSTN 115, by the caller. The process then returns to box 203 where the voice message system 100 awaits another incoming call on the port.

Figure 3B:
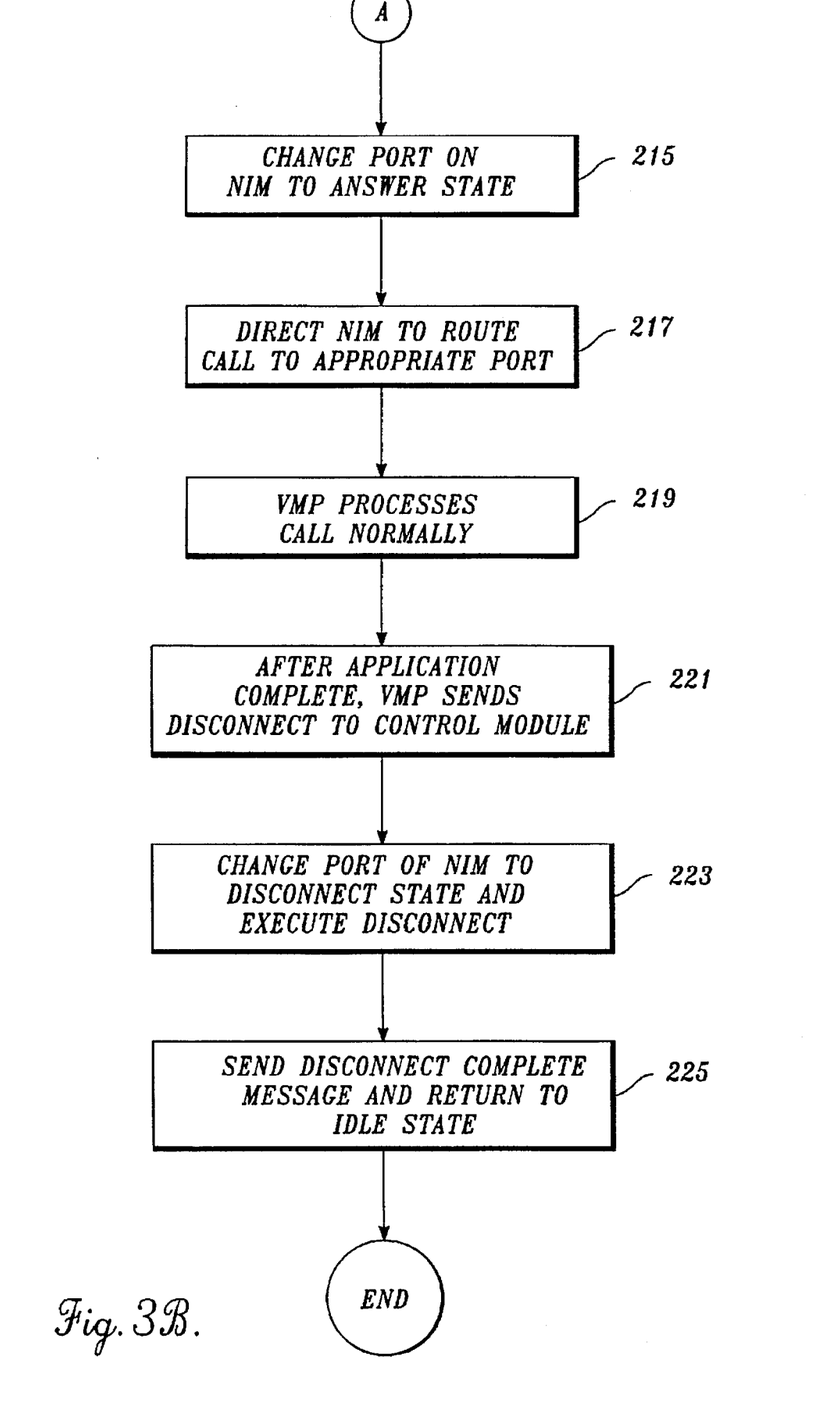

If, however, the number is found to be valid in the VMP 101, turning to box 215 in FIG. 3B, the VMP 101 will send a message to the control module 105 causing the control module 105 to change the state of the port of the NIM 103 that the incoming call is incident 16 an answer state. Along with this message, the VMP 101 will provide information as to which DID 42 the NIM 103 should route the incoming call through. At box 217, the control module 105 then changes the state of the incoming call port on the NIM 103 to an answered state and sends a message to the NIM 103 to answer the incoming call and connect the incoming call port through to the designated DID 42 of the VMP 101.

After the incoming call has been connected to the VMP 101, at box 219, the VMP 101 will process the incoming call in normal fashion. In particular, the VMP 101 will begin execution of the appropriate application associated with the number called by prompting the caller and interacting with the caller. By the term "application," as can be appreciated by those skilled in the art, it is meant the process by which the VMP 101 would normally answer an incoming call as if directly through its direct inward dial ports 42. For example, one common application is to play a greeting to the calling party, i.e., "Welcome to the voice mailbox of Don Espeut. He is unavailable to answer your call. Please leave a message at the tone." Next the application will record the voice message and store the message in digital format on hard drive 50. Alternatively, as will be seen in greater detail below, the application may allow for further options, such as paging the subscriber and holding until the subscriber calls the voice message system 100 for interconnection with the caller.

It should be noted that under the above described interconnection of the calling party to the voice message system 100, and particularly the VMP 101, the caller is unaware that the routing of his call has taken place via a control module 105 and a NIM 103. From the calling party's perspective, the handling of the voice message system 100 is transparent and the calling party is unaware that there is a network of VMPs 101 operating in parallel and front-ended by NIM 103. For example, any DTMF digits entered by the caller will be passed through the NIM 103 and processed by the VMP 101 as if the caller had called the VMP 101 directly. In this manner, the caller is able to perform all applications that VMP 101 would normally support.

After the caller completes the application, at box 221, the VMP 101 will disconnect the caller by sending a disconnect message to the control module 105. The control module 105 will then instruct the NIM 103 to disconnect the caller. At box 223, the control module 105 will then change the state of the incoming port to a disconnect state. Still in box 223, the NIM 103, upon receipt of the disconnect message will enter into the disconnect state and will execute the disconnect message by disconnecting the incoming call. Once the disconnect is completed by the NIM 103, at box 225, the NIM 103 will send a disconnect complete message to the control module 105 and change the incoming port into idle state. Upon receipt of the disconnect complete message from the NIM 103, the control module 105 will update its records to reflect that the port has returned to idle state. The previously used port of the NIM 103 and the control module 105 will then be ready to handle a new incoming call.

Figure 4:
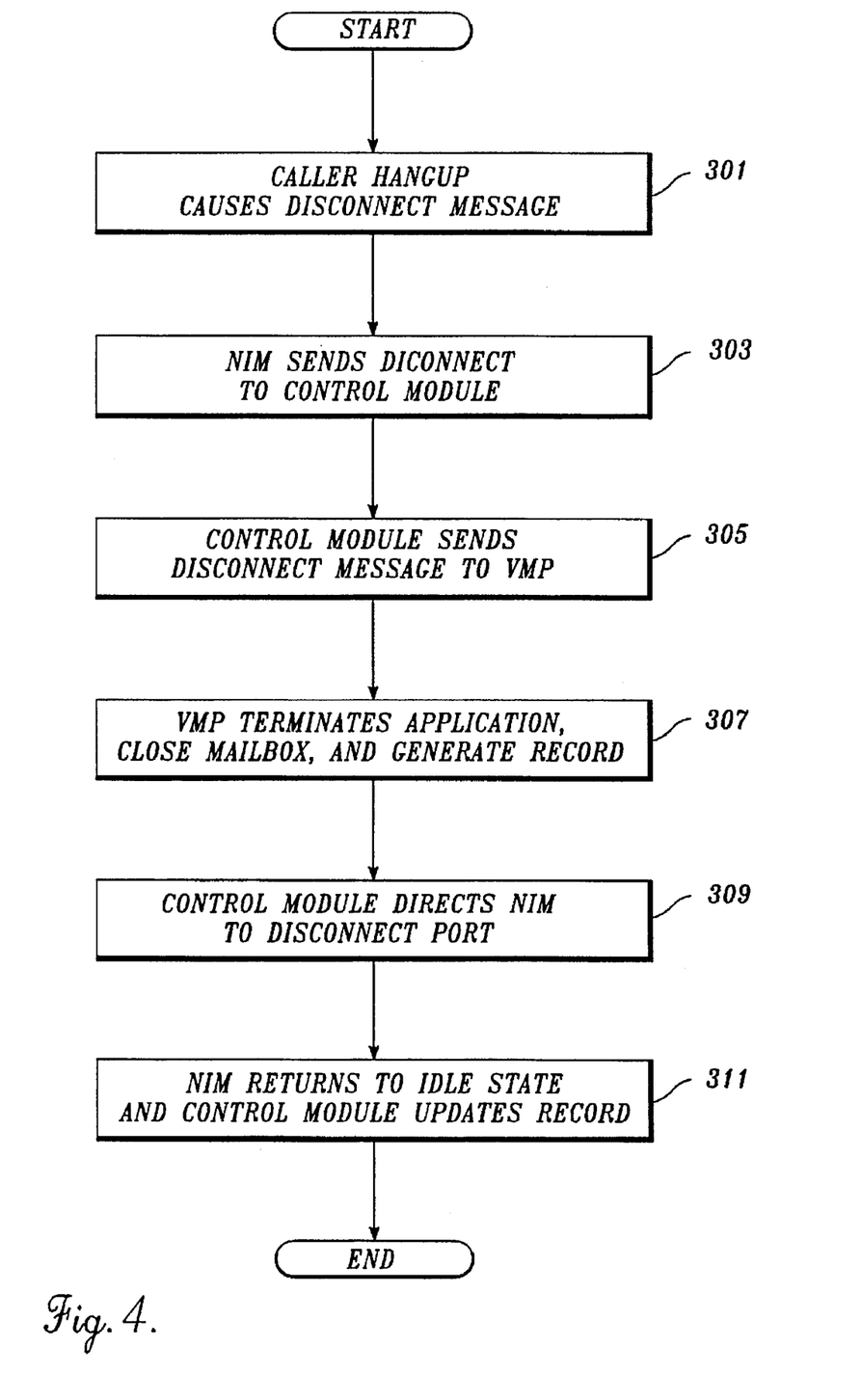
FIG. 4 is a detailed block diagram illustrating the actions of the voice message system in response to a caller hanging up on the voice message system prior to completion of an application on a VMP.

Turning now to FIG. 4, if prior to completion of the application with the VMP 101 the caller decides to hang up, as is known in the art, at box 301, a disconnect indication will be sent by the PSTN 115 to the NIM 103. At box 303, the NIM 103 will receive the disconnect indication and will send a disconnect indication to the control module 105 indicating the caller has disconnected the call. At box 305, the control module 105 will in turn send a message to the VMP 101 indicating that the caller has disconnected. At box 307, the VMP 101 will then terminate the application, close the called party's (subscriber) mailbox and generate a call detail record in accordance with its normal routines. Next, at box 309, the control module 105 will then send a message to the NIM 103 to disconnect the incoming port on the NIM 103 to the DID 42 of VMP 101. Finally, at box 311, NIM 103 will send a disconnect complete message to the control module 105 and the port of the NIM 103 will return to idle state. Similarly, the control module 105 will update its records to reflect that the port has returned to idle state. The previously used port of the NIM 103 and the control module 105 will then be ready to handle a new incoming call.

As discussed above, in some applications, the calling party may be placed on hold while the VMP 101 attempts to contact the subscriber. As described in commonly assigned co-pending application Ser. No. 08/302,682, a "meet-me" application on a VMP 101 is provided whereby a caller can call a VMP 101 and be placed on hold while the VMP 101 pages the called subscriber. If the subscriber calls into the VMP 101, the calling party and the subscriber are interconnected.

In the case of the new system architecture exemplified in FIG. 1, the process of placing a caller on hold and paging the subscriber is modified to accommodate the NIM 103 and control module 105. The process by which the voice message system 100 handles the meet me application can best be seen with reference to FIG. 5A. In particular, within box 219 of FIG. 3B, where the calling party is connected to the VMP 101 and the VMP 101 is running the meet-me application, next at box 401, the VMP 101 will play an explanatory message and place the caller on hold. For example, the message may state: "You have reached the voice mailbox of Don Espeut. Please hold while the messaging system attempts to contact Mr. Espeut for connection to you. Or, if you wish, please press 1 to leave a message in his voice mailbox or press 0 for Mr. Espeut's secretary." In particular, the CPU 48 of VMP 101 will access the message on hard drive 50 and play the message over the DID 42.

Figure 5A:
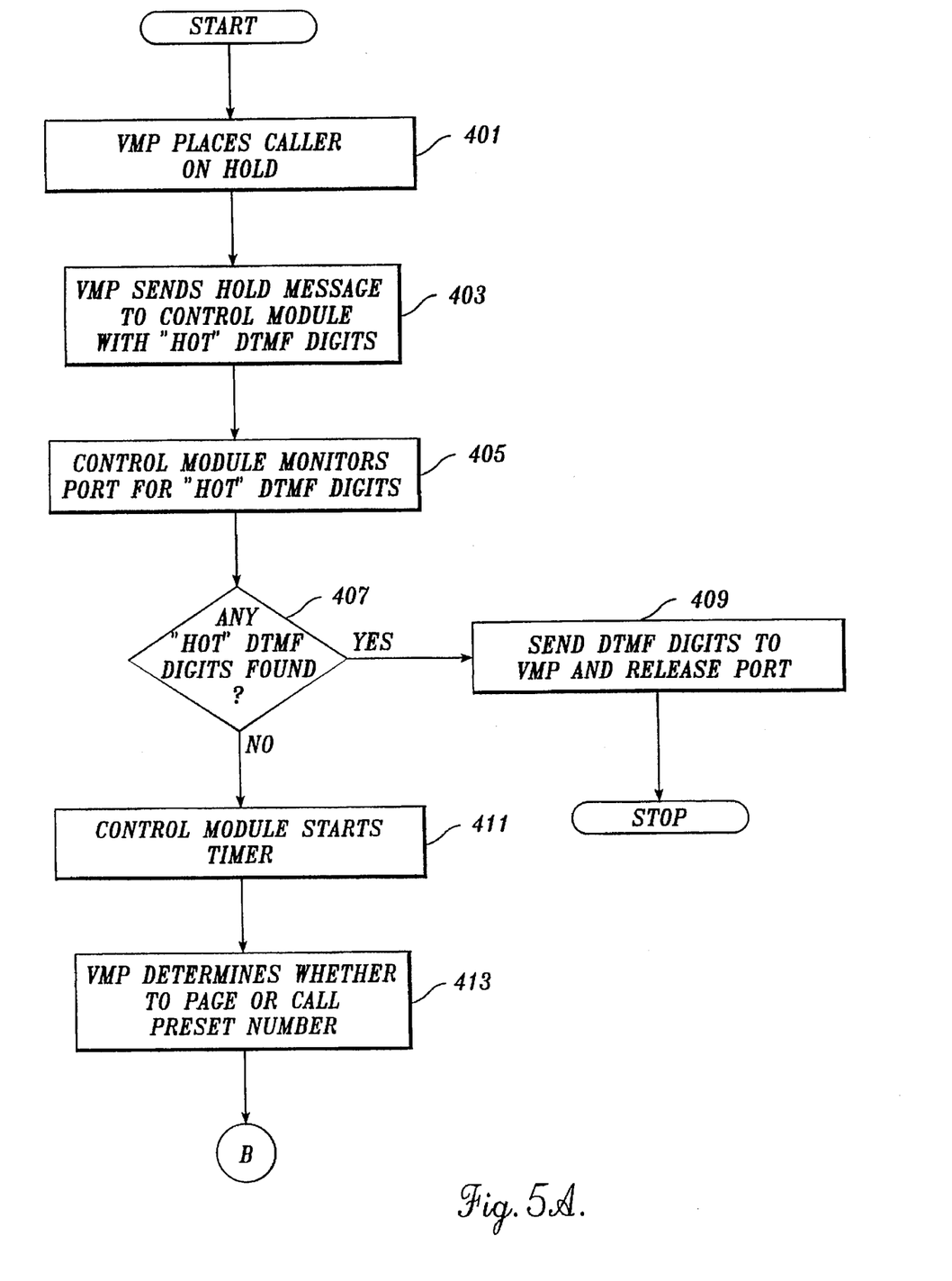
FIGS. 5A–5D are detailed block diagrams illustrating the actions of the voice message system handling a meet-me application.

Next, at box 403, the VMP 101 will send a hold message to the control module 105 indicating to place the caller in a hold state. The hold message also includes certain DTMF digits ("hot" digits) that the control module 105, at box 405, is to look for that will interrupt the hold condition. These DTMF digits allow the caller to bypass the meet-me function of the VMP 101 and skip to another action, such as leaving a message in the subscriber's mailbox. This allows the calling party to "opt out" and leave a message. In the example above, if the caller enters a "1" or a "0", the control module will send back a message to the VMP 101 indicating the DTMF digits entered. If the caller enters any other DTMF digits, the digits are ignored. The VMP 101 will, depending upon the digits entered, remove the call from hold and reconnect the call and continue processing.

Thus, at box 407, a determination is made as to whether any "hot" digits are entered by the caller. If so, then at box 409, the DTMF digits are sent to the VMP 101 and the port is released from hold state and returned to answer state. If however, there are no "hot" digits entered, then the caller is continued to be placed on hold by the NIM 103. While the caller is on hold, at box 411, the control module 105 starts a timer.

Next, at box 413, the VMP 101 determines how to reach the subscriber that has been called. In particular, the CPU 48 of VMP 101 accesses hard drive 50 for the database record of the subscriber. Within the database record, information is present as to the preference of the subscriber on how to be contacted in the event a calling party wishes to contact the subscriber. For example, the database record may instruct the VMP 101 to page the subscriber at a predetermined pager number and to await a reply call from the subscriber on a predetermined reply number. Alternatively, the database record may instruct the VMP 101 to call a predetermined number in an attempt to reach the subscriber. The predetermined number may be, for example, the subscriber's cellular telephone or the subscriber's home telephone. In one embodiment, the predetermined number that is to be called by the VMP 101 is dependent upon the time at which the calling party is attempting to reach the subscriber. Thus, where the calling party is calling in the evening, the predetermined number to be called may be the subscriber's home. If the calling party is calling between 5:00 p.m. and 6:00 p.m., the predetermined number to be called may be the subscriber's cellular phone. These parameters may be configured by to subscriber to suit his or her particular circumstances.

Figure 5B:
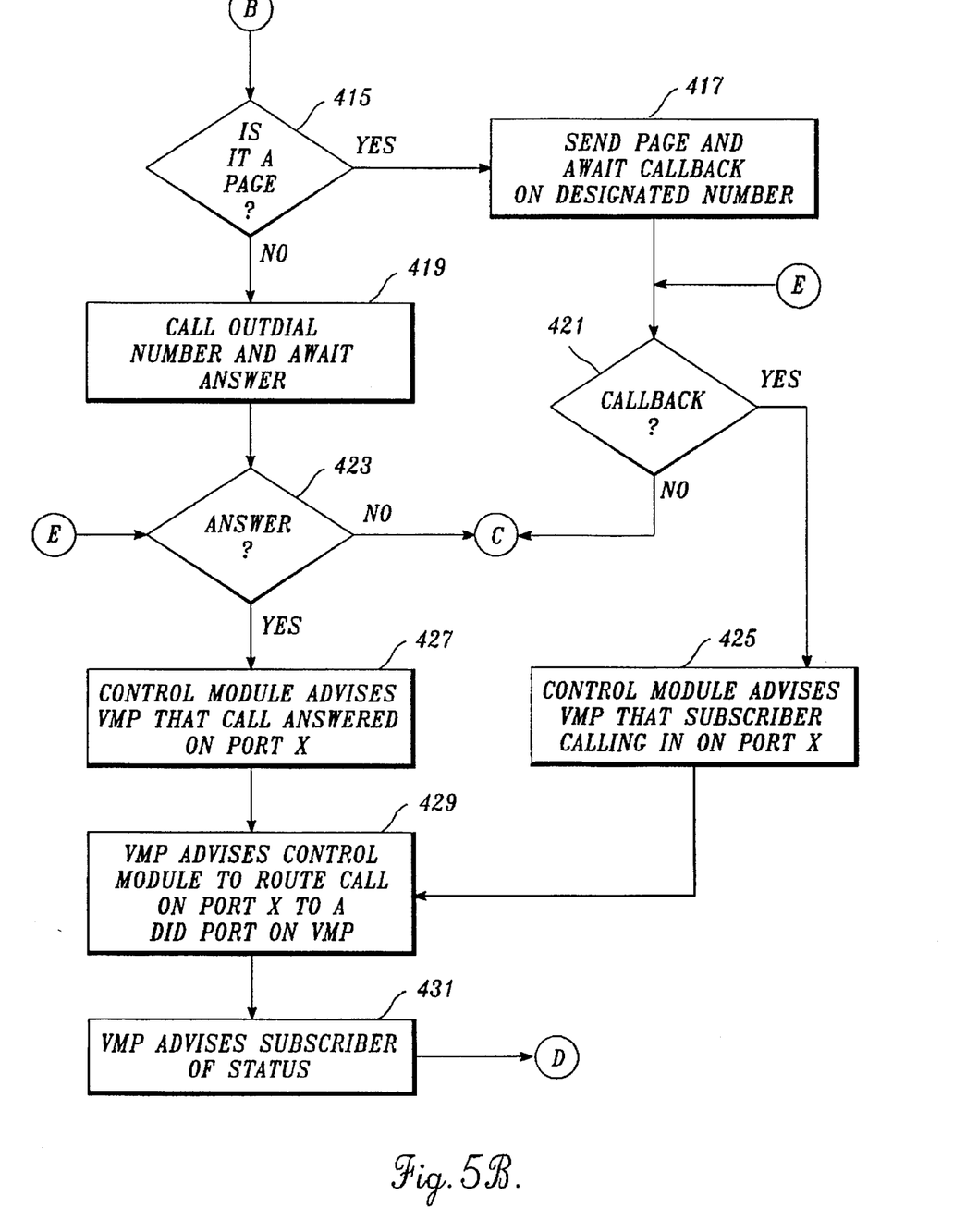

Turning next to FIG. 5B, while the caller is on hold, at box 415, the VMP 101 determines whether or not from review of the subscriber's database record whether the subscriber wishes to be contacted via a page or a telephone call. If the subscriber is to be contacted via page, at box 417, the VMP 101 will direct the control module 105 to seize a port on the NIM 103. Further, still at box 417, the VMP 101 will then outdial the subscriber's pager number via the PSTN 115 and place a page to the subscriber. The page will include information on the appropriate call-back number to use in replying to the page. Alternatively, the page may simply be a default alphanumeric message such as "Call voice mail for waiting call." A knowledgeable subscriber will then simply have to call his preassigned private call-back number to reach the voice message system 100. It should be noted that the call-back number will be routed through the NIM 103. Still at box 417, the voice message system 100 will await a reply from the subscriber.

Alternatively, the VMP 101 may, instead of calling out via the PSTN 115 to initiate a page, be connected to a paging terminal. In such a case, the VMP 101 will generate a page and transmit the page directly to the paging terminal. The page may, for example, be in the Telecator Network Paging Protocol (TNPP) format.

Next, at box 421, a determination is made as to whether or not the subscriber has called back on the designated call-back number. If the caller does not call back, then, referring to FIG. 5D, at box 445, a determination is made as to whether or not the timer in the control module 105 has expired. If not, then control reverts to box 421 where the control module 105 is still awaiting for a call back. Thus, the control module 105 simply waits until the subscriber calls back on the designated number. If the timer in the control module 105 has expired, then, at box 447, the control module 105 releases the hold on the calling party's incoming port to the VMP. Next, at box 449, the VMP. in the preferred embodiment, plays a "refresher message" to allay the calling party fears of being "lost" in the voice message system 100. For example, the message may state: "Please continue to hold while Mr. Espeut is being located."

At box 451, after the refresher message is played to the calling party, the VMP 101 directs the control module 105 to place the call back on hold and to restart the timer. Next, the control module 105 determines whether the maximum time that a caller is to be placed on hold has been reached. This prevents the calling party from being placed on hold indefinitely. The maximum time that a caller can be place on hold is predetermined for the voice message system 100. If, at box 453, the maximum time of hold has not been reached, then control returns to box 445. If however, the maximum time of hold has been reached, then, at box 455, the control module takes the caller off of hold state. In addition, the control module 105 sends a message to the VMP 101 that maximum hold time has been reached and that the caller will be connected to the VMP 101. The VMP 101 then places the caller directly into the voice mailbox of the subscriber with an explanatory message such as: "We're sorry, Mr. Espeut cannot be located at this time. Please leave a message." After the caller leaves a message, the call is considered completed and the voice message system 100 disconnects the call as previously described above.

Returning to FIG. 5B at box 421, if the subscriber does reply to the page, then at box 425, the control module advises the VMP 101 that the subscriber has replied to the page and is calling back on port X of NIM 103. Upon receiving the message from the control module 105, VMP 101 allocates a DID 42 port for receiving the call back from the subscriber. Next, at box 429, the VMP 101 advises the control module 105 to route the call back from the subscriber to the designated DID 42 port on the VMP 101. Once the subscriber has been routed to the appropriate DID 42 port of VMP 101, at box 431, the VMP 101 advises the subscriber of the status of calling party. For example, in one preferred embodiment, the VMP 101 provides an explanatory message such as: "You have a caller waiting. He is calling from phone number XXX-XXXX. Do you wish to connect? Press 'Y' for yes and 'N' for no." It can be appreciated that various messages may be played to the subscriber to allow the subscriber to have a menu of options other than connect or do not connect. The calling party's phone number can be ascertained from the automatic number identification (ANI) information transmitted by the PSTN when the calling party initiated contact with the voice message system 100. As an alternative method of identifying the calling party to the subscriber, when the VMP 101 initially answered the calling party at box 219, the VMP 101 may have been configured to prompt the calling party to leave his or her name. The VMP 101 may then replay the name to the subscriber.

Figure 5C:
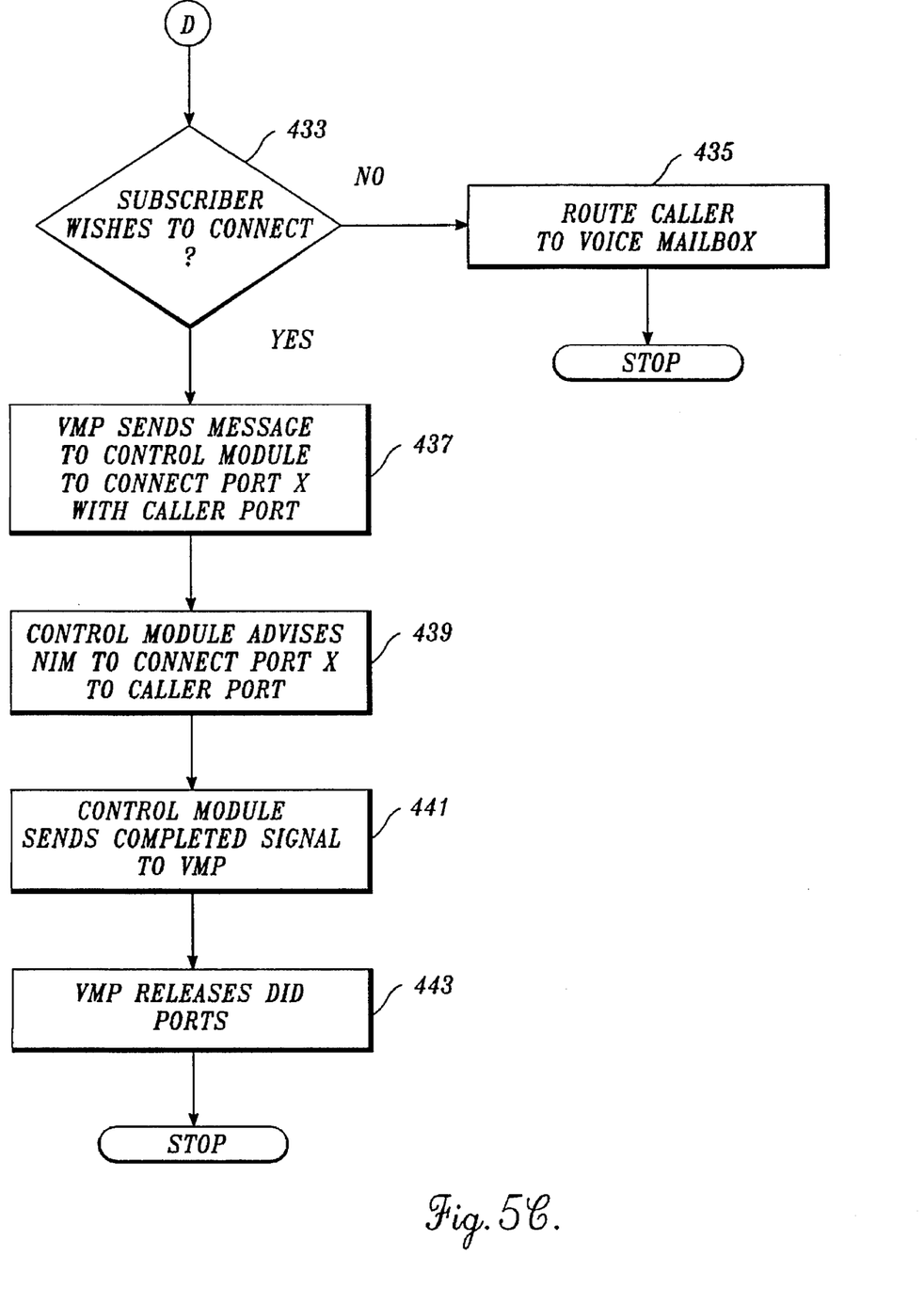
Figure 5D:
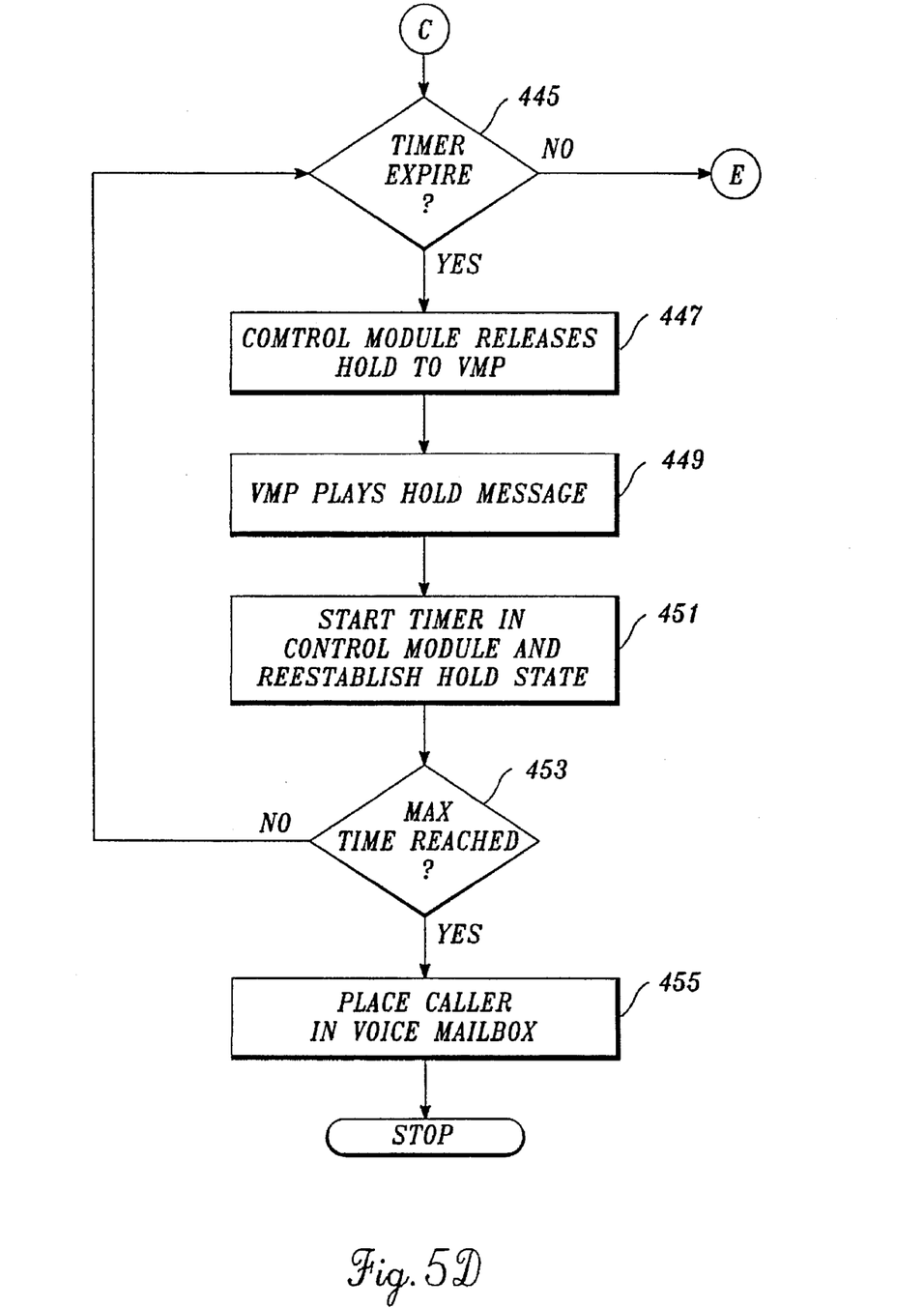

Next, at box 433 in FIG. 5C, the VMP determines if the subscriber wishes to connect to the calling party. If the subscriber, after determining the identity of the calling party, does not wish to connect with the calling party, then at box 435, VMP 101 routes the calling party into the subscriber's voice mailbox. If the subscriber does wish to speak with the calling party, at box 437, the VMP 101 sends a message to the control module 105 to connect the subscriber calling in on port X of the NIM 103 to the port of the NIM 103 of the calling party. Thus, at box 439, the control module 105 directs the NIM 103 to connect port X to the calling party port. At that point, the calling party and the subscriber may converse. Next, at box 441, the control module 105 sends a call connect completed signal to the VMP 101. In response to this message, at box 443, the VMP 101 releases the DID 42 ports for other connections.

One advantage apparent from the architecture of the present invention is that by the use of NIM 103, a substantially higher number of interconnections between subscribers and calling parties can be maintained. As just described, when the calling party and the subscriber are finally connected, the connection is made through the NIM 103. In prior art meet me applications, the calling party would occupy one DID 42 port on the VMP 101 and the subscriber would occupy a second DID 42 port. Both DID 42 ports would be occupied for the entire duration of the interconnection. By having the subscriber and calling party converse via the NIM 103 while releasing the DID 42 ports of the VMP 101, a much larger number of meet me interconnections can be supported.

With the description of the process for locating a subscriber by means of a page complete, the description of the process for locating a subscriber by means of an outgoing telephone call will now be described. Returning to FIG. 5B, at box 419, VMP 101 directs the control module 105 to place a call to the predetermined number using a particular port X. Port X will be placed in an outcall state. The control module 105 will then send a series of messages to the NIM 103 informing the NIM 103 to seize the designated port, dial the desired telephone number, wait for an answer, and send a message to the control module 105 that the call has been answered. Thus, at box 423, a determination is made as to whether or not the outcall is successful by having the subscriber answer.

If the outcall is not answered, then the process shown in FIG. 5D is executed as described above. If however, the call is answered, then at box 427, the NIM 103 sends a message to the control module 105 indicating such. The control module 105 will then send a message to the VMP 101 indicating that the call was answered on port X.

The VMP 101 will then send a message to the control module 105 to connect the port to the VMP 101. Next, at box 429, the VMP 101 advises the control module 105 to route the call back from the subscriber to a designated DID 42 port on the VMP 101. Once the subscriber has been routed to the appropriate DID 42 port of VMP 101, at box 431, the VMP 101 advises the subscriber of the status of calling party. For example, in one preferred embodiment, the VMP 101 provides an explanatory message such as: "You have a caller waiting. He is calling from phone number XXX-XXXX. Do you wish to connect? Press 'Y' for yes and 'N' for no." It can be appreciated that the calling party's phone number can be ascertained from the automatic number identification (ANI) information transmitted by the PSTN when the calling party initiated contact with the voice message system 100. As an alternative method of identifying the calling party to the subscriber, when the VMP 101 initially answered the calling party at box 219, the VMP 101 may have been configured to prompt the calling party to leave his or her name. The VMP 101 may then replay the name to the subscriber. After the calling party has been identified to the subscriber, the process described above in FIG. 5C is executed.

Figure 6:
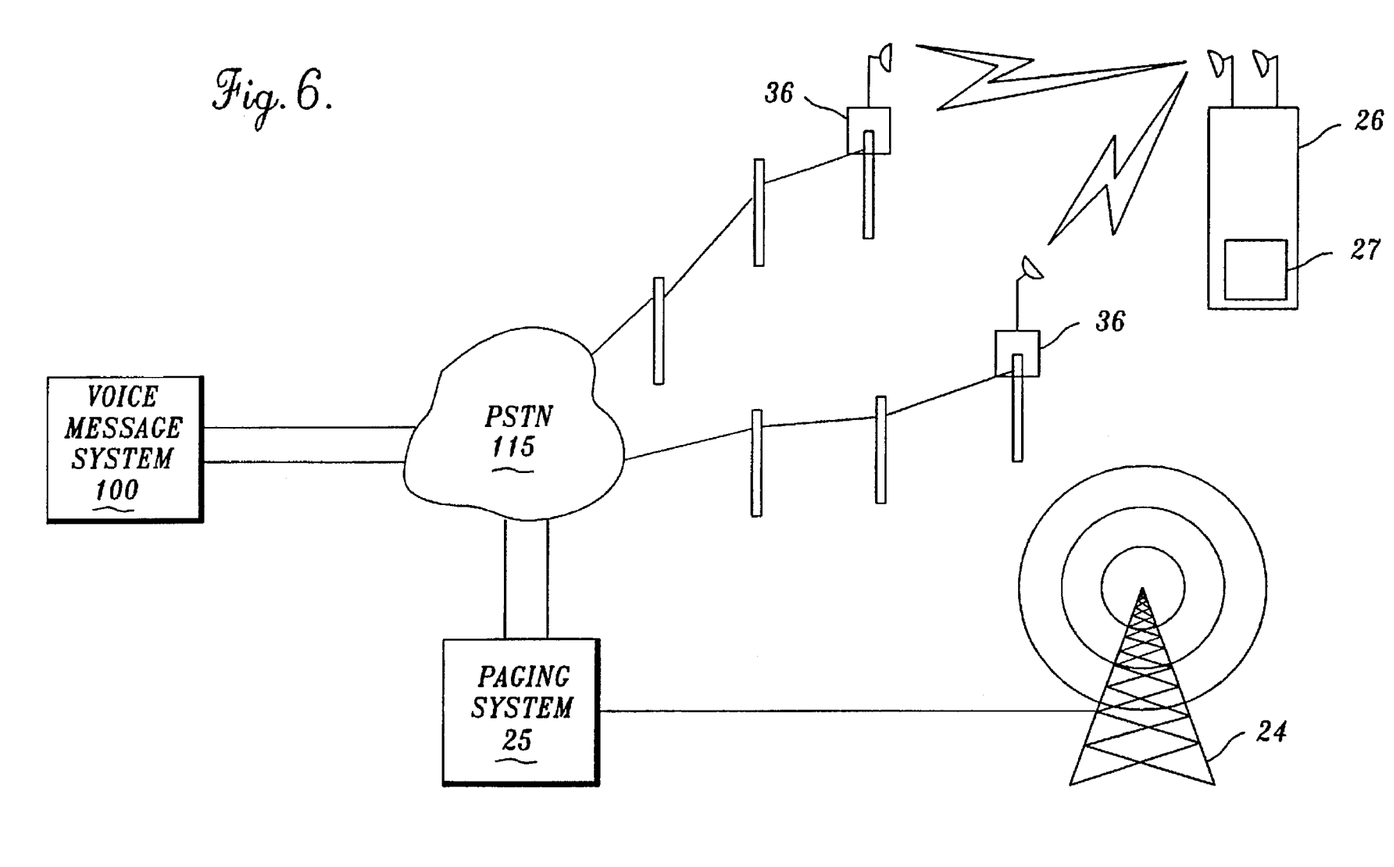
FIG. 6 is a schematic diagram of the voice message system of the present invention integrated with a CT-2 radio telephone system.

Turning to FIG. 6, the system of this invention is used in conjunction with a cordless telephone-2 (CT-2) wireless communications system. Persons that subscribe to the system each carry a small, portable handset 26, that serves as a transceiver over which audio, voice, or data signals can be exchanged through the CT-2 system. Integral with the handset 26 is a pager 27, which is a small receiver for receiving signals from the paging system. A suitable pager 27 that can be built into the handset 26 is the Bravo™ pager manufactured by Motorola of Schaumburg, Ill.

As described above, the voice message system 100 accesses a paging system 25 through the PSTN 115 for paging a called subscriber. When called, the paging system 25 broadcasts a page from broadcast tower 24, which is received by the pager 27. In order to ensure that the handset transceiver and the pager do not interfere with each other's operation, they are selected to operate at substantially different frequencies. In one preferred version of this invention, the handset 26 and CT-2 base stations 36 exchange signals at frequencies between 864 and 868 MHz. and the pager 27 receives pages from the broadcast tower 24 at approximately 150 MHz.

The CT-2 system includes a set of base stations 36 that are low-powered transceivers configured to exchange signals with the handsets 26. Each base station 36 is connected to the PSTN 115 and serves as the signal interface between the PSTN 115 and the handset 26 with which a radio link has been established. When a system subscriber receives a page, he or she can access the caller by activating the handset transceiver. A telephone link will be established between handset 26 and the voice message system 100 through an adjacent base station 36 and the PSTN 115. When the subscriber's call reaches the system, the voice message system 100, as further described above, connects the caller to the subscriber so that the two can converse in a normal manner.

Each base station 36 includes processing circuitry to read header information transmitted by the handset 26. The header information is used by the base station 36 to identify the subscriber so that appropriate billing information can be forwarded to a billing office (not illustrated). One such base station 36 is the Concept 2030 manufactured by GPT Telepoint, Coventry, United Kingdom.

A suitable CT-2 handset 26 is the Concept 2000, also manufactured by GPT Telepoint. In current CT-2 systems, a typical handset 26 can be used to exchange signals with a base station 36 that is within a range of approximately 200 to 400 meters. The handset 26 of this invention further includes an autodial function. This function causes the handset 26 to automatically dial and transmit a specific number, such as the subscriber's private number to call when a calling party is waiting at the voice message system 100, when the subscriber presses a specific button (not illustrated) on the handset.

In use, each CT-2 handset 26 must register its location to the voice message system 100. This is accomplished by having the subscriber initiate a registration process for the handset 26. Upon command of the subscriber, the handset 26 will send a message to the nearest base station 36 requesting registration. In the request for registration, the handset's identification number is included. The base station 36 will then initiate a call to the NIM 103 of the voice message system 100. The base station 36 after the call has been accepted by the NIM 103 will provide to the control module 105 handset identification number and the location of base station 36. The control module 105 of the voice message system 100 receives the information and the information is placed into the database record corresponding to the handset identification number. After this information is successfully received by the control module, confirmation tones are transmitted back to handset 26 via base station 36.

Once the handset 26 is registered with a particular base station 36, operation of the system can proceed. For example, if a calling party wishes to reach the subscriber carrying a CT-2 handset, the following process would take place. First, the incoming call will be received by the NIM 103 which passes the information to the control module. The control module, as described above, determines the particular VMP 101 associated with the subscriber. The VMP 101 attempts to contact the subscriber by outdialing to the CT 2 handset, as detailed above in FIGS. 5A–5D. If the subscriber answers, then the meet-me connection is completed.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A voice messaging system for storing voice or data messages for a plurality of subscribers, said voice messaging system operating to connect a calling party from a public switched telephone network to a desired subscriber of said plurality of subscribers, said voice message system comprising:

a plurality of voice message processors, each including a plurality of ports and each one of said plurality of voice message processors having assigned thereto for handling a predetermined portion of said plurality of subscribers;

a network interface module for receiving calls from said public switched telephone network, said network interface module including a plurality of network ports for receiving said calls, said network interface module also communicatively connected to each of said voice message processors through said ports of said voice message processors;

a control module for directing the interconnection of said calling party to a voice message processor assigned to said desired subscriber, said control module including a database that corresponds each of said plurality of subscribers to one of said voice message processors, said control module also operative to direct said network interface module to initiate an alerting call to said desired subscriber upon request of said voice message processor; and a local area network communicatively connecting said network interface module, said plurality of voice message processors, and said control module, wherein said network interface module connects said alerting call to said subscriber to said calling party further wherein the ports of said voice message processor associated with said calling party and said alerting call are released by said voice message processor.

2. The system of claim 1, further including a terminal server connected to said local area network, said terminal server including a plurality of modems that can receive incoming calls from said subscribers to said system, said terminal server providing access for said subscribers to a voice message processor assigned to said subscribers.

3. The system of claim 1 wherein the local area network is a TCP/IP compatible network.

4. The system of claim 1 wherein the telephone number of said alerting call is dependent upon the time at which the calling party calls.

5. A method of connecting a calling party from a public switched telephone network to a called subscriber of a plurality of subscribers of a voice message system, said voice message system including a plurality of voice message processors, each including a plurality of ports and each one of said voice message processors having assigned thereto for handling a predetermined portion of said plurality of subscribers, a network interface module for receiving calls from said public switched telephone network, said network interface module including a plurality of receiving ports for receiving said calls, said network interface module also communicatively connected to each of said voice message processors through said ports of said voice message processors, a control module for directing the interconnection of said calling party to a voice message processor assigned to said desired subscriber, said control module including a database that corresponds each of said plurality of subscribers to one of said voice message processors, a local area network communicatively connecting said network interface module, said plurality of voice message processors, and said control module, said method comprising:

receiving a call from said calling party through said network interface module on a receiving port of said network interface module;

determining said voice message processor assigned to said called subscriber;

routing said call from said calling party to one of said ports of said voice message processor assigned to said called subscriber;

having the voice message processor assigned to said called subscriber generate an alerting call to said called subscriber through one of said ports of said voice message processor and an outward calling port of said network interface module;

awaiting an answer from said called subscriber;

connecting said called subscriber to said calling party by interconnecting said outward calling port and said inward calling port of said network interface module.

6. The method of claim 5 further including releasing the ports of said voice message processor associated with said calling party and said alerting call when said calling party and said called subscriber are connected.

7. The method of claim 5 further including determining the time at which said call of said calling party arrives at said voice message processor and selectively determining the telephone number of said alerting call based upon the time at which said call of said calling party arrives.

* * * * *